United States Patent
Hughes et al.

(10) Patent No.: US 7,496,037 B2
(45) Date of Patent: Feb. 24, 2009

(54) APPARATUS, SYSTEM, AND METHOD FOR FACILITATING DELIVERY OF ASYNCHRONOUS RESPONSE MESSAGES

(75) Inventors: Gerald Dean Hughes, Morgan Hill, CA (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 11/152,516

(22) Filed: Jun. 14, 2005

(65) Prior Publication Data

US 2007/0005678 A1 Jan. 4, 2007

(51) Int. Cl.
*H04L 12/26* (2006.01)
*H04L 12/66* (2006.01)
*H04L 9/00* (2006.01)
*G06F 15/16* (2006.01)
*G06F 15/173* (2006.01)

(52) U.S. Cl. ............... 370/235; 370/401; 370/412; 709/202; 709/238; 713/153; 726/4; 726/21

(58) Field of Classification Search ............ 370/235, 370/401, 412; 709/202, 238; 713/153; 726/4, 726/21
See application file for complete search history.

(56) References Cited

U.S. PATENT DOCUMENTS

| | | | | |
|---|---|---|---|---|
| 5,692,128 A * | 11/1997 | Bolles et al. | ............... | 709/224 |
| 5,751,956 A * | 5/1998 | Kirsch | ............... | 709/203 |
| 6,185,619 B1 * | 2/2001 | Joffe et al. | ............... | 709/229 |
| 6,233,617 B1 | 5/2001 | Rothwein et al. | ............... | 709/227 |
| 6,470,027 B1 | 10/2002 | Birrell, Jr. | ............... | 370/465 |
| 6,601,101 B1 | 7/2003 | Lee et al. | ............... | 709/227 |
| 6,622,157 B1 * | 9/2003 | Heddaya et al. | ............... | 709/202 |
| 6,721,795 B1 * | 4/2004 | Eldreth | ............... | 709/232 |
| 6,892,218 B2 * | 5/2005 | Heddaya et al. | ............... | 709/202 |
| 6,895,429 B2 * | 5/2005 | Banga et al. | ............... | 709/215 |
| 6,938,031 B1 * | 8/2005 | Zoltan et al. | ............... | 707/1 |
| 7,000,016 B1 * | 2/2006 | Vanderbeck et al. | ............... | 709/226 |
| 7,287,071 B2 * | 10/2007 | MacLean | ............... | 709/224 |
| 7,411,939 B1 * | 8/2008 | Lamb et al. | ............... | 370/352 |
| 2001/0017862 A1 | 8/2001 | Tokuyo et al. | ............... | 370/401 |
| 2002/0178381 A1 * | 11/2002 | Lee et al. | ............... | 713/201 |
| 2002/0188702 A1 | 12/2002 | Short, III et al. | ............... | 709/220 |
| 2003/0079032 A1 | 4/2003 | Orsolits et al. | ............... | 709/230 |
| 2003/0133464 A1 * | 7/2003 | Marejka et al. | ............... | 370/411 |
| 2004/0010617 A1 * | 1/2004 | Akahane et al. | ............... | 709/243 |
| 2004/0039775 A1 | 2/2004 | Yoshida et al. | ............... | 709/203 |
| 2005/0033985 A1 * | 2/2005 | Xu et al. | ............... | 713/201 |
| 2005/0182958 A1 * | 8/2005 | Pham et al. | ............... | 713/200 |
| 2005/0192099 A1 * | 9/2005 | Nguyen et al. | ............... | 463/42 |
| 2006/0050630 A1 * | 3/2006 | Kobayashi et al. | ............... | 370/216 |

* cited by examiner

*Primary Examiner*—Alpus H Hsu
(74) *Attorney, Agent, or Firm*—Kunzler & McKenzie (57) ABSTRACT

A database server storing an authorization module and a rerouting module. The authorization module may be configured to define a second network interface module authorized to relay a response message queued in a hold queue associated with a first network interface module, where the response message is generated in response to a first request message. The rerouting module may be configured to route the response message from the hold queue to the second network interface module in response to a second request message requesting messages queued in the hold queue. The present invention thus enables delivery of requested queued messages despite failure of the request for such messages to correspond to the queue in which the messages are contained.

20 Claims, 6 Drawing Sheets

APPARATUS, SYSTEM, AND METHOD FOR FACILITATING DELIVERY OF ASYNCHRONOUS RESPONSE MESSAGES

BACKGROUND OF THE INVENTION

1. Field of the Invention

The invention relates to client-server communications. Specifically, the invention relates to apparatus, systems, and methods for facilitating delivery of asynchronous response messages queued in a hold queue.

2. Description of the Related Art

Transmission Control Protocol/Internet Protocol ("TCP/IP") has gained significant popularity in recent years due to its robust suite of services and applications, as well as its almost universal compatibility with other transport technologies and equipment. These features render TCP/IP an optimal transport vehicle for data over networks, including the worldwide Internet, to which corporations and individuals alike link their individual networks.

The vastness and complexity of networks, however, complicate data transport. Indeed, a network may include a complex hierarchy of subnetworks several layers deep. To connect the various subnetworks, routers, gateways, and network interface modules may be implemented to direct a flow of data traffic to a particular destination.

Typically, routing decisions are based on the destination address in the header information of each data packet, as well as on routing information maintained by each router, gateway and nework interface along the route. Since a network interface module generally bears a one to one relationship with a hold queue, for example, a router may request data queued in a hold queue by routing a request message to the network interface module corresponding to the hold queue.

In some applications, however, routing decisions may be largely indiscriminate to facilitate workload balancing between network interface modules. Indeed, clustering technology may incorporate a load optimizer such as Parallel Sysplex® that enables multiple network interface modules to collaborate to provide enhanced availability, increased capacity and workload balancing across a network. This feature may be particularly beneficial to business critical and high volume applications such as sales and other financial transactions. Such systems, however, may inadvertently impair delivery of certain response messages.

Indeed, in some cases, a response message generated in answer to a request message through a first network interface module may be queued in a hold queue associated with a particular second network interface module. This situation may result, for example, where a client-server connection is interrupted before the client receives the requested response message, where the response requires delivery to a second client, or where communication occurs over a heterogeneous environment comprising more than one network. In such a case, the client may send a request to retrieve messages queued in the hold queue. Depending on the network interface module across which such a retrieval request is routed, however, the hold queue may or may not deliver the queued messages. Indeed, for security reasons, the hold queue may only respond to a request message routed across its associated network interface module. This problem may be exacerbated in a high availability communications environment where routing decisions are based on workload balance rather than a network interface module-specific route.

Such miscommunication may compromise the speed and reliability of data transfer. Indeed, available bandwidth and memory may be reduced as a result of a network congested with repetitive requests for data maintained in a hold queue associated with a different network interface module. Such miscommunication may also compromise data security by necessitating multiple requests for queued data, issued in an effort to pass the request over the network interface module associated with the queue of interest.

From the foregoing discussion, it should be apparent that a need exists for an apparatus, system, and method that facilitates delivery of asynchronous response messages to a client. Beneficially, such an apparatus, system, and method would provide reliable data transfer, increase data transfer speed, and decrease data security risks. Such an apparatus, system, and method are disclosed and claimed herein.

SUMMARY OF THE INVENTION

The present invention has been developed in response to the present state of the art, and in particular, in response to the problems and needs in the art that have not yet been met for facilitating delivery of asynchronous response messages to a client. Accordingly, the present invention has been developed to provide an apparatus, system, and method for facilitating delivery of asynchronous response messages to a client that overcomes many or all of the above-discussed shortcomings in the art.

An apparatus according to the present invention includes a database server storing an authorization module and a rerouting module. The authorization module may be configured to designate a second network interface module authorized to relay a response message queued in a hold queue associated with a first network interface module, where the response message is generated in response to a first request message. The rerouting module may be configured to route the response message from the hold queue to the second network interface module in response to a second request message requesting messages queued in the hold queue. In some embodiments, the rerouting module may be configured to select a network interface module across which to route the response message from a subset of the network interface modules defined by the authorization module. The present invention thus enables delivery of requested queued messages despite failure of indentifiers in the request for such messages to correspond to the queue in which the messages are contained.

In some embodiments, the authorization module may designate the second network interface module upon connection of the database server to at least one network interface module. Alternatively, the authorization module may designate the second network interface module during a database session. For example, the second network interface module may be designated during a handshaking process that establishes a database session. Further, in certain embodiments, the authorization module may be configured to designate at least one additional network interface module authorized to relay the response message queued in the hold queue associated with the first network interface module.

In other embodiments, the apparatus may further include a load optimizer configured to arbitrarily route the first request message and/or the second request message across one of a plurality of network interface modules, the plurality of network interface modules including the first and second network interface modules.

A system of the present invention is also presented to facilitate delivery of asynchronous response messages. The system may include a load optimizer and a database server, where the load optimizer may be configured to arbitrarily route a request message to the database server across one of a plurality of network interface modules. In some embodiments, the load optimizer functions to maintain load balance across the plurality of network interface modules.

As in the apparatus, the database server may store an authorization module and a rerouting module. The authorization module may be configured to designate a second network interface module authorized to relay a response message queued in a hold queue associated with a first network interface module, wherein the response message is generated in response to a first request message. The rerouting module may be configured to route the response message from the hold queue to the second network interface module in response to a second request message requesting messages queued in the hold queue associated with the first network interface module, where the requested messages queued include the response message.

In certain embodiments, the system may further include a coupling facility maintaining the hold queue associated with the first network interface module and configured to enable a plurality of database servers to access the hold queue. The coupling facility may further include a second hold queue associated with the second network interface module.

A method of the present invention is also presented for facilitating delivery of asynchronous response messages to a client. In one embodiment, the method includes loading an authorization mapping designating a second network interface module authorized to relay a response queued in a hold queue associated with a first network interface module. The method may further include receiving, across the first network interface module, a first request and generating a response to the first request. The response may be stored in a hold queue corresponding to the first network interface module. A second request for one or more messages queued in the hold queue associated with the first network interface module may be received across the second network interface module, the response message being included in the one or more requested messages queued. Finally, the method may include routing the response from the hold queue to the second network interface module in accordance with the authorization mapping.

In some embodiments, receiving the first and second requests across the first and second network interface modules, respectively, may be the result of an arbitrary routing decision by a load optimizer. In other embodiments, the method may further include modifying the authorization mapping to include at least one additional network interface module authorized to relay a response queued in the hold queue associated with the first network interface module. In such a case, the method may include selecting a network interface module across which to route the response from a subset of the network interface modules authorized to relay the response queued in the hold queue associated with the first network interface module. The hold queue may optionally be maintained in a coupling facility accessible by more than one database server.

The present invention thus facilitates delivery of response messages to a client, even where the request for such message fails to pass through a network interface module corresponding to the queue in which such message is contained. In this manner, the present invention may also increase data transfer speed by reducing an amount of data continuously stored in data queues, and may decrease security risks resulting from multiple requests over a network for data transmission.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

As used in this specification, the term "database management system" refers to a set of computer programs that controls the organization, storage and retrieval of data in a database. The term "hold queue" refers to a waiting area for files, print jobs, messages, or any other item being sent from one computer or device to another. The term "load optimizer" refers to a device, module, collection of modules or other load balancing system configured to balance a workload between multiple network interface modules. The term "network interface module" refers to an interface between communication modules over a network and a database management system. Finally, the term "asynchronous response message" refers to a data packet generated by the database management system in response to a request message received, via independent message communication connections, from a client.

Figure 1:
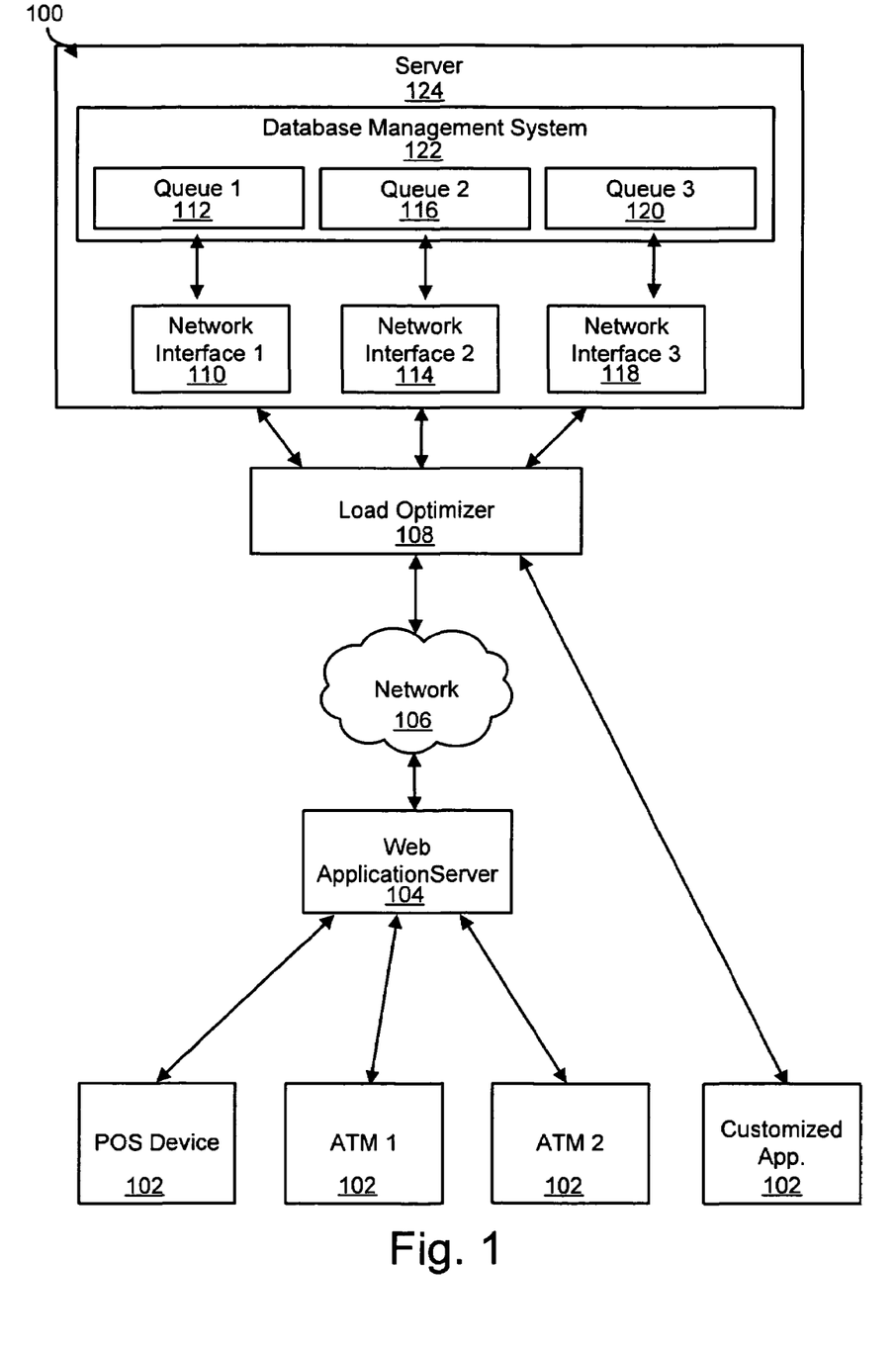
FIG. 1 is a schematic block diagram illustrating a client-server communications system in accordance with certain embodiments of the present invention.

Referring now to FIG. 1, a client-server communications system 100 generally includes a client 102 communicating with a remote server 124 through a chain of devices and/or protocols. A client 102 may include, for example, a point of sale terminal, a web browser, Automated Teller Machine (ATM) software, a printer or other output device, a customized software application, or any other application or device known to those in the art.

In some embodiments, an intermediate device in the client-server communication chain may include a web application server 104 in direct communication with the client 102. A web application server 104 may include, for example, WebSphere®, Apache®, Oracle®, or any other such web application server known to those in the art. The web application server 104 may serve up web pages, data and other applications and information to the client 102 over a network 106. The network 106 may comprise, for example, direct terminal connections, a Local Area Network ("LAN"), a Wide Area Network ("WAN"), the Internet, or the like, and may implement a network communications protocol such as Transmission Control Protocol/Internet Protocol (TCP/IP) to transport data over the network 106. In other embodiments, for example where the client 102 includes a customized software application, client-server communication may bypass the web application server 104 and network 106 to allow direct communication between the client 102 and the server 124.

The server 124 may include a combination of hardware and software executing various operating systems, such as Multiple Virtual Storage ("MVS"), OS/390, zSeries/Operating System ("z/OS"), UNIX, Linux, and the like. The server 124 may include a database management system 122 such as an Information Management System (IMS®) to facilitate data organization, storage and retrieval. Further, in some cases, the server 124 may include or communicate with a load optimizer 108 and one or more network interface modules 110, 114 and 118 to facilitate client-server communication.

Specifically, network interface modules 110, 114 and 118 may contribute to data transfer efficiency by providing multiple routes over which client-server communications may take place. Indeed, multiple network interface modules 110, 114 and 118 prevent congestion by enabling data to be routed to server systems that are available to handle it. In this manner, multiple network interface modules 110, 114 and 118 may cooperate to enhance server 124 capacity.

Despite this capability, network interface modules 110, 114, and 118 are prone to imbalance resulting from variance in input volumes, where one network interface module 110, 114 or 118 may experience peak volume while another network interface module 110, 114 and 118 has a lull in input. To avoid this result, a load optimizer 108 may communicate with at least one network interface module 110, 114 and 118 to establish communication between the client 102 and the server 124 depending on workload balance and network interface module 110, 114 and 118 availability. To this end, the load optimizer 108 may arbitrarily select one of the network interface modules 110, 114, 118 through which a specific data packet may be routed to facilitate data transfer speed and reliability.

In certain embodiments, the database management system 122 may include one or more hold queues 112, 116 and 120 to maintain asynchronous response messages pending transport, where each hold queue 112, 116, and 120 is associated with exactly one network interface module 110, 114, and 118, respectively. Asynchronous response messages may be queued in a hold queue 112, for example, in cases where a client-server connection is interrupted before the client 102 receives a requested response message, where a response message requires delivery to a second client, and/or where client-server communication occurs over a heterogeneous environment comprising more than one network.

To retrieve data from a hold queue, conventional client-server communications systems 100 require network interface-specific routing information in a request message from the client 102 to the database management system 122. Specifically, because each hold queue 112, 116 and 120 maintained by the database management system 122 corresponds to exactly one network interface module 110, 114 and 118, a request message for queued data must be specifically routed across the network interface module 110, 114 and 118 corresponding to the hold queue 112, 116, and 118 in which the data is queued. This ensures that asynchronous response messages are securely provided to a client authorized to receive the response message.

Figure 2:
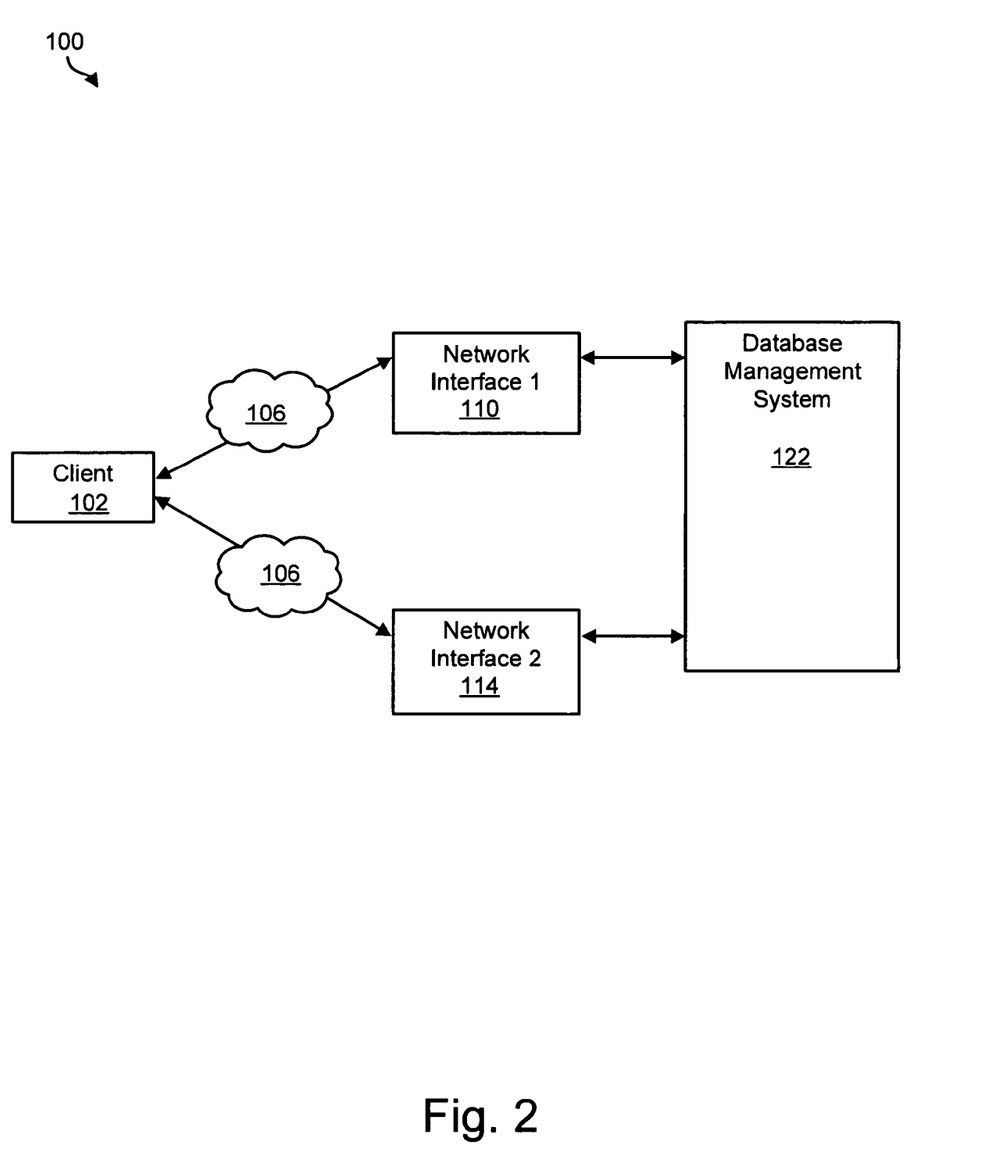
FIG. 2 is a schematic block diagram detailing data transport between a client and database management system in a routerless communications system.

Certain client-server communications systems 100 implement address-specific data transport and thus do not generally include a load optimizer 108 as an intermediate device. Referring now to FIG. 2, in some embodiments of an address-specific data transport system, a client 102 may define a request message (not shown) to include a route to a database management system 122 via a first network interface module 110. In other embodiments, the request message may define a route to the database management system 122 via an alternate network interface module 114. The database management system 122 may then generate an asynchronous response message (not shown) in answer to the request message.

In the absence of interrupted client-server communication, delivery of the response message to a secondary output device, or communication within a heterogeneous environment, the response message may be delivered to client 102 by reversing the path established by the request message. Thus, where the request message originated at the client 102, was sent over a network 106, across the first network interface module 110, and delivered to the database management system 122, the response message generated in answer to the request message may be sent from the database management system 122, across the first network interface module 110, over the network 106, to the client 102. Similarly, where a request message was sent to the database management system 122 via a second network interface module 114, a response message generated in answer thereto may be delivered to the client 102 by following a reverse path including the second network interface module 114.

Figure 3:
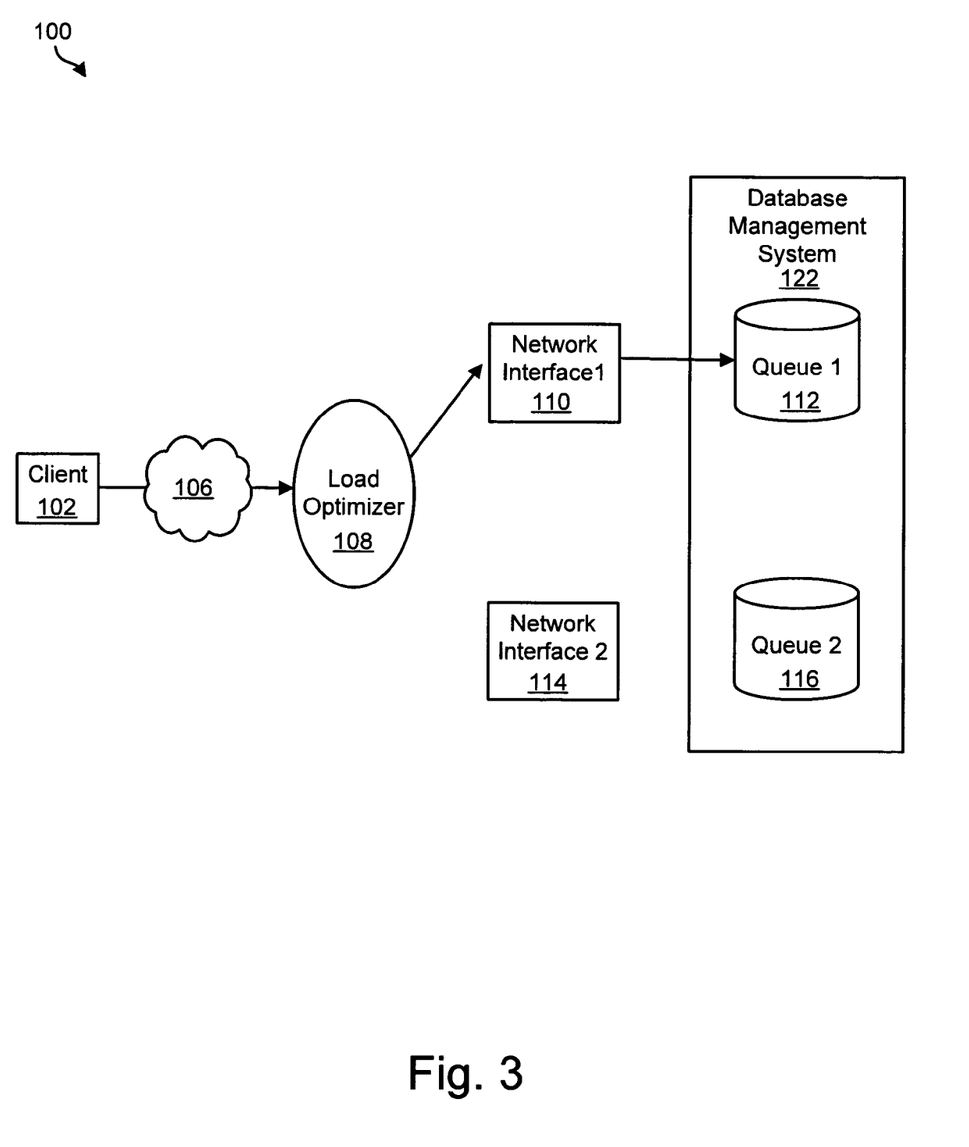
FIG. 3 is a schematic block diagram illustrating a data transport path in a high availability communications system that is interrupted before the client receives a response generated by the database management system.

Referring now to FIG. 3, other client-server communications systems 100, particularly systems involving business critical and high volume data transport, may integrate a load optimizer 108 as an intermediate component of the system 100 to facilitate quick and reliable client-server communication. In some embodiments, a load optimizer 108 may facilitate high availability communications. A load optimizer 108 may include, for example, a Dynamic Virtual IP address ("DVIPA") or Sysplex Distributor® that resides on a TCP/IP stack independent of any particular physical adapter. In certain embodiments, the load optimizer 108 may route request messages across any network interface module 110, 114 in communication therewith depending on network interface module availability and load balance. Alternatively, a load optimizer 108 may include an independent physical device adapted to route messages according to various criteria, including, for example, network interface module-specific address information.

In one embodiment, the client 102 may initiate communication with a database management system 122 integral to a server 124 by sending a request message over a network 106 to a load optimizer 108. The load optimizer 108 may then forward the request message to a first network interface module 110 depending on network interface module 110, 114 availability, current traffic load, and load balancing requirements, or according to network interface 110, 114-specific address information. The first network interface module 110 may then deliver the request message to the database management system 122. The route selected by the load optimizer 108 to deliver the request message to the client 102 may be transparent to the user 102 to facilitate seamless and rapid data transport.

As in the address-specific data transport system detailed above with reference to FIG. 2, an asynchronous response message generated by the database management system 122 of FIG. 3 in answer to the request message may follow the reverse of a path established by the request message. In the illustrated embodiment, for example, the response message generated by the database management system 122 may travel through the first network interface module 110 to the load optimizer 108, over the network 106, and to the client 102

The response message generated in answer to a request message in either the system of FIG. 2 or the system of FIG. 3 may, under certain circumstances, be queued in a hold queue 112, 116 corresponding to the network interface module 110, 114 through which the request message was sent. In one embodiment of the system depicted in FIG. 3, for example, the client 102 may send the request message over a network 106 to a load optimizer 108. The load optimizer 108 may route the request message across a first network interface module 110 to the database management system 122. In response, the database management system 122 may generate an asynchronous response message destined for delivery back to the client 102, as discussed above.

Prior to receipt of the response message by the client 102, however, client-server communication may be interrupted. Alternatively, the response message may be destined for a second client 102 or for another network in a heterogeneous environment. In any such event, or under any other circumstances known to those in the art, the response message may be queued in a first hold queue 112 corresponding to the first network interface module 110 through which the request message was routed.

Retrieving the asynchronous response message generated in answer to the request message may require the client 102 to initiate a second request message (not shown). The second request message, however, does not require the database management system 122 to generate a second response message in answer thereto. Rather, the second request message simply requests from the database management system 122 the previously generated response message and/or queued messages including the response message from the first hold queue 112. As mentioned previously, conventional client-server communications systems 100 generally require that the second request message be routed via the first network interface module 110 before the response message is sent from the first hold queue 112 to the client 102. Upon receipt of the second request message, the database management system 122 may forward the previously generated response message and/or queued messages including the response message from the first hold queue 112 to the client 102.

Figure 4:
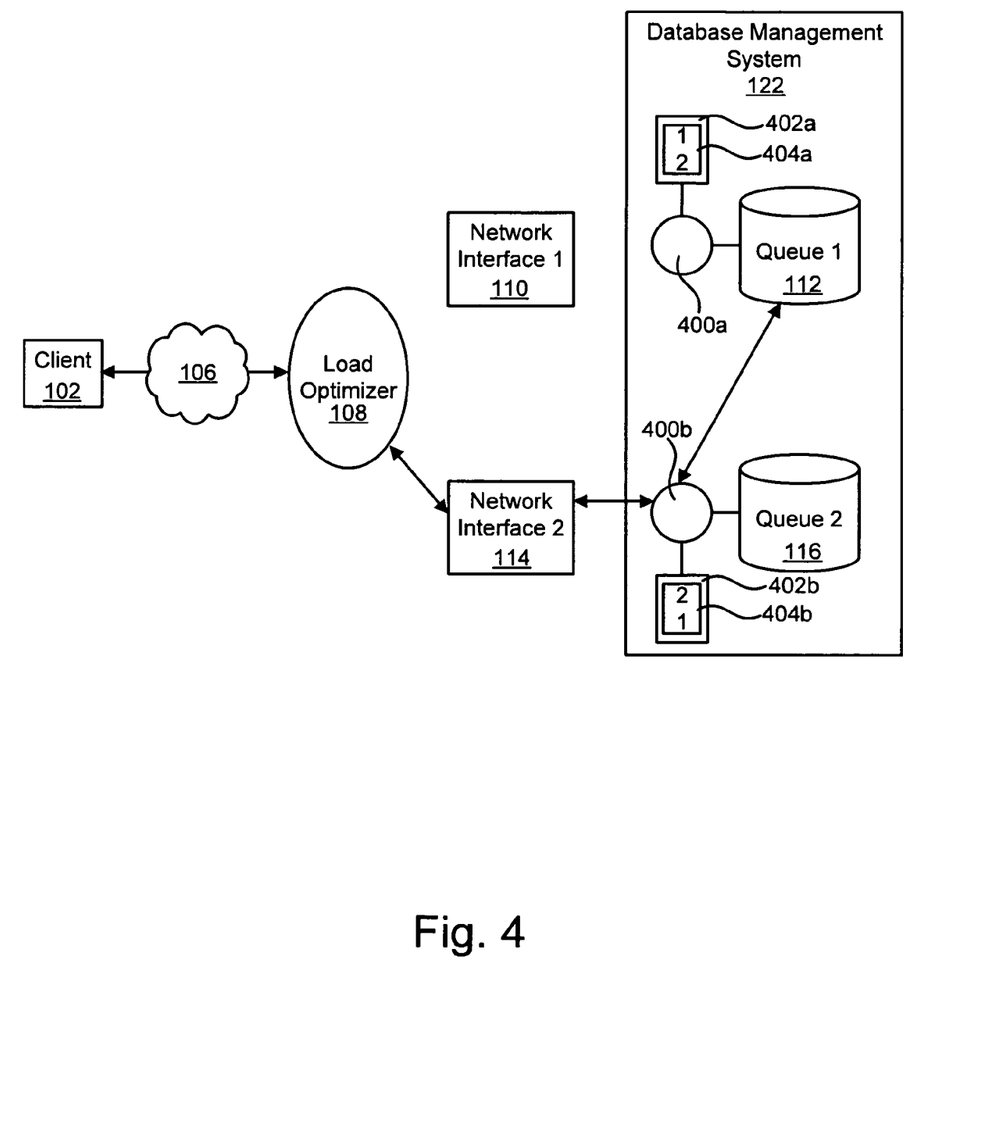
FIG. 4 is a schematic block diagram illustrating a data transport path between a client and a database management system that incorporates an authorization module and rerouting module in accordance with certain embodiments of the present invention.

The present invention facilitates delivery of queued response messages to a client 102 even where the second request message does not follow the route taken by the first request message. Referring now to FIG. 4, a database management system 122 in accordance with the present invention may include an authorization module 402a, b configured to enable a queued response message to be relayed by a network interface module 110, 114 other than the network interface module 110, 114 associated with the hold queue 112, 116 maintaining the response message. The authorization module 402a, b may include an authorization mapping 404a, b that identifies certain network interface modules 110, 114 authorized to relay response messages queued in a particular hold queue 112, 116.

As illustrated by FIG. 4, for example, a first authorization module 402a associated with the first hold queue 112 may authorize the first and second network interface modules 110 and 112 to relay asynchronous response messages queued in the first hold queue 112. The authorization mapping 404a corresponding to the authorization module 402a may identify the authorized network interface modules as "1," corresponding to the first network interface module 110, and "2," corresponding to the second network interface module 114.

Similarly, a second authorization module 402b associated with the second hold queue 116 may authorize the first and second network interface modules 110 and 112 to relay response messages queued in the second hold queue 116. The authorization mapping 404b corresponding to the authorization module 402b may also identify the authorized network interface modules as "1," corresponding to the first network interface module 110, and "2," corresponding to the second network interface module 114.

In certain embodiments, the authorization module 402a, b may define one or more network interface modules 110, 114 authorized to relay asynchronous response messages from the associated hold queue 112, 116. The authorization module 402a, b may define authorized network interface modules 110, 114 upon connection of the database management system 122 to the network interface module 110, 114, or during a database session.

As discussed in more detail below, the present invention may further include a rerouting module 400a, b configured to route the response message from the hold queue 112, 116 in which it is maintained to a network interface module 110, 114 defined by the authorization module 402a, b, identified in the corresponding authorization mapping 404a, b, and associated with the rerouting module 402a, b.

In operation, according to one embodiment, the client 102 may initiate communication with a server 124 (See FIG. 1) and associated database management system 122 by sending a request message over a network 106 to a load optimizer 108. As illustrated by FIG. 4, the load optimizer 108 may arbitrarily route the request message across a first network interface module 110 to the database management system 122. The database management system 122 may then generate and queue an asynchronous response message in a first hold queue 112 corresponding to the first network interface module 110 for any of the previously identified reasons, or for any other reason known to those in the art.

To retrieve the response message generated by the database management system 122 and queued in the first hold queue 112, the client 102 may direct a second request message to the database management system 122. Specifically, the request message may be routed over the network 106 to the load optimizer 108, and then arbitrarily routed to a second network interface module 114. In conventional systems, the second request message would fail to retrieve the response message since the response message is queued in a hold queue 112 associated with the first network interface module 110 and inaccessible by the second network interface module 114. In one embodiment of the present invention, however, an authorization module 402b associated with the second network interface module 114 authorizes the network interface module 114 to access and relay response messages queued in the first hold queue 112.

In accordance with the authorization mapping 404b identifying the second network interface module 114 as authorized to relay response messages queued in the first hold queue 112, the rerouting module 400b associated with the second network interface module 114 may retrieve the response message from the first hold queue 112. In some embodiments, the rerouting module 400b associated with the second network interface module 114 may instead retrieve all queued messages or a plurality of queued messages, including the response message, from the first hold queue 112 as identified by the rerouting module 400b. Whether all response messages or select response messages are retrieved may depend on the type of request message.

Figure 5:
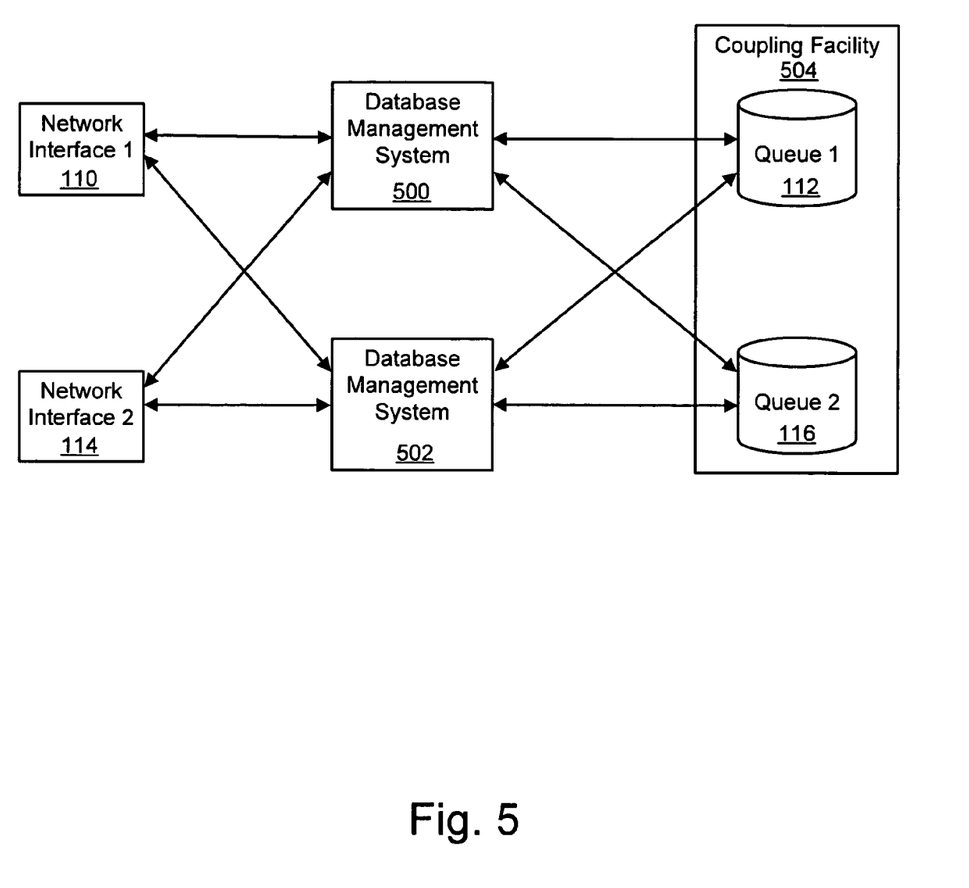
FIG. 5 is a schematic block diagram illustrating a client-server communications system incorporating multiple database management systems in accordance with certain embodiments of the present invention.

Referring now to FIG. 5, certain embodiments of the present invention may be implemented in an environment including multiple database management systems 500, 502 in communication with multiple network interface modules 110, 114 and associated hold queues 112, 116. In one embodiment, for example, a first database management system 500 may communicate with a first network interface module 110 associated with a first hold queue 112, as well as with a second network interface module 114 associated with a second hold queue 116. First and second hold queues 112 and 116 may reside in a coupling facility 504 or other device known to those in the art that enables multiple database management systems 500 and 502 to access the hold queues 112 and 116.

Indeed, a second database management system 502 may also communicate with the first network interface module 110 and its associated first hold queue 112, in addition to communicating with the second network interface module 114 and second hold queue 116. Although each database management system 500 and 502 may access either hold queue 112 and 116 by virtue of the coupling facility 504, such access may depend upon the network interface module 110, 114 through which a request message is routed, thus confining communications between associated network interface modules 110, 114 and queues 112, 116.

Figure 6:
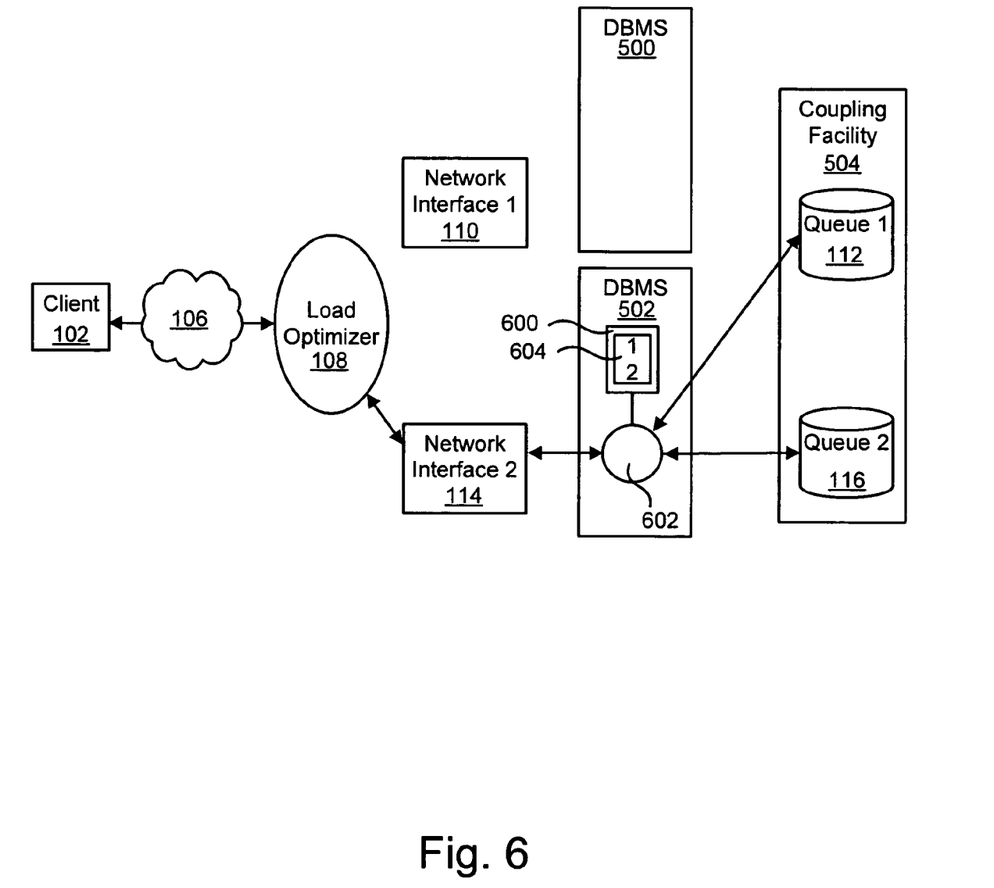
FIG. 6 is a schematic block diagram depicting a data transport path between the client and database management system of FIG. 5, where the database management system integrates an authorization mapping and rerouting module in accordance with certain embodiments of the present invention.

Referring now to FIG. 6, certain embodiments of the present invention may be implemented within the multiple database management system 500, 502 environment to expand communication by enabling access to a hold queue 112, 116 not inherently associated with a network interface module 110, 114 across which a request message is routed. Specifically, in one embodiment, a request message may originate at the client 102 and be sent over a network 106 to a load optimizer 108. The load optimizer 108 may arbitrarily route the request message to a first network interface module 110 according to network interface module availability and load balance. The request message may be received by a first database management system 500 in communication with a coupling facility 504 housing the associated first hold queue 112. The database management system 500 may then generate a response message in answer to the request message. The response message, which may be stored in the first hold queue 112 within the coupling facility 504.

In certain embodiments, the client 102 may then initiate a second request message requesting the queued response message. The second request message may be routed over the network 106 to the load optimizer 108, and then arbitrarily routed through the second network interface module 114. The second network interface module 114 may communicate with the second database management system 502 to request the response message from the first hold queue 112. Despite the second database management system's 502 ability to access the first hold queue 112 by virtue of the coupling facility 504, the second database management system 502 may be unable to retrieve the response message absent authorization and routing provided in accordance with certain embodiments of the present invention.

Specifically, the second database management system 502 may include an authorization module 600 and rererouting module 602 in accordance with certain embodiments of the present invention. As illustrated by FIG. 6, the authorization module 600 may authorize the second network interface module 114 to access and relay asynchronous response messages from the first and second hold queues 112 and 116. Accordingly, the rererouting module 602 may access the first hold queue 112 and retrieve the queued response message. The rererouting module 602 may then route the response message along the same path taken by the second request message, proceeding from the second database management system 502, across the second network interface module, 114 to the load optimizer 108, over the network 106, and to the client 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for facilitating delivery of asynchronous response messages to a client, the apparatus comprising:
    a database server comprising a processor and a memory device configured to store executable and operational data, the memory device comprising:
        an authorization module which designates a second network interface module authorized to relay a response message queued in a hold queue associated with a first network interface module, wherein the response message is generated in response to a first request message; and
        a rerouting module which routes the response message from the hold queue to the second network interface module in response to a second request message, the second request message requesting at least one message queued in the hold queue associated with the first network interface module, wherein the at least one message queued comprises the response message.

2. The apparatus of claim 1, wherein the authorization module designates the second network interface module upon connection of the database server to at least one network interface module.

3. The apparatus of claim 1, wherein the authorization module designates the second network interface module during a database session.

4. The apparatus of claim 1, further comprising a router which arbitrarily routes the first request message to one of a plurality of network interface modules, the plurality of network interface modules comprising the first network interface module.

5. The apparatus of claim 4, wherein the router also arbitrarily routes the second request message to one of the plurality of network interface modules, the plurality of network interface modules comprising the second network interface module.

6. The apparatus of claim 1, wherein the authorization module further designates at least one additional network interface module authorized to relay the response message queued in the hold queue associated with the first network interface module.

7. The apparatus of claim 6, wherein the rerouting module selects a network interface module across which to route the response message from a subset of the network interface modules designated by the authorization module.

8. A system for facilitating delivery of asynchronous response messages to a client, the system comprising:
    a load optimizer configured to arbitrarily route a request message to a database server across one of a plurality of network interface modules; and
    a database server comprising a processor and a memory device configured to store executable and operational data, the memory device comprising:
        an authorization module which designates a second network interface module authorized to relay a response message queued in a hold queue associated with a first network interface module, wherein the response message is generated in response to a first request message; and
        a rerouting module which routes the response message from the hold queue to the second network interface module in response to a second request message, the second request message requesting at least one message queued in the hold queue associated with the first network interface module, wherein the at least one message queued comprises the response message.

9. The system of claim 8, wherein the load optimizer maintains load balance across the plurality of network interface modules.

10. The system of claim 8, wherein the authorization module designates the second network interface module upon connection of the database server to at least one network interface module.

11. The system of claim 8, wherein the authorization module designates the second network interface module during a database session.

12. The system of claim 8, wherein the authorization module further designates at least one additional network interface module authorized to relay the response message queued in the hold queue associated with the first network interface module.

13. The system of claim 12, wherein the rerouting module selects a network interface module across which to route the response message from a subset of the network interface modules designated by the authorization module.

14. The system of claim 8, further comprising a coupling facility maintaining the hold queue associated with the first network interface module and which enables a plurality of database servers to access the hold queue.

15. The system of claim 14, wherein the coupling facility further comprises a second hold queue associated with the second network interface module.

16. A computer readable medium tangibly embodying a program of computer-readable instructions executable by a digital processing apparatus to perform operations to facilitate delivery of asynchronous response messages to a client, the operations comprising:

loading an authorization mapping designating a second network interface module authorized to relay a response queued in a hold queue associated with a first network interface module;

receiving, across the first network interface module, a first request;

generating a response to the first request;

storing the response in the hold queue corresponding to the first network interface module;

receiving, across a second network interface module, a second request for at least one message queued in the hold queue associated with the first network interface module, the at least one message comprising the response; and     routing the response from the hold queue to the second network interface module in accordance with the authorization mapping.

17. The computer readable medium of claim 16, wherein receiving, across the first network interface module, the first request further comprises receiving the first request across the first network interface module as a result of an arbitrary routing decision by a load optimizer.

18. The computer readable medium of claim 16, the operations further comprising modifying the authorization mapping to identify at least one additional network interface module authorized to relay a response queued in the hold queue associated with the first network interface module.

19. The computer readable medium of claim 16, the operations further comprising maintaining the hold queue in a coupling facility accessible by more than one database server.

20. A system for facilitating delivery of asynchronous response messages to a client, the system comprising:

a coupling facility storing a hold queue associated with a first network interface module, the coupling facility enabling access to the hold queue by one or more database servers;

a first database server in communication with the coupling facility, the first database server authorized to access the hold queue associated with the first network interface module; and     a second database server in communication with the coupling facility and authorized to access the hold queue associated with the first network interface module,     each of the first and second database servers comprising a processor and a memory device configured to store executable and operational data, the data comprising:

an authorization module which designates a second network interface module authorized to relay a response message queued in the hold queue associated with the first network interface module, wherein the response message is generated in response to a first request message; and         a rerouting module which routes the response message from the hold queue to the second network interface module in response to a second request message, the second request message requesting at least one message queued in the hold queue associated with the first network interface module, wherein the at least one message queued comprises the response message.

\* \* \* \* \*